June 18, 1963 A. KIENAST 3,094,588

ELECTRICAL COMMUNICATION SYSTEM

Filed July 14, 1958 2 Sheets-Sheet 1

Inventor
Alfred Kienast
By
Watson, Cole, Grindle & Watson
Attorneys

Inventor
Alfred Kienast
By
Watson, Cole, Grindle & Watson
Attorneys

United States Patent Office 3,094,588

Patented June 18, 1963

3,094,588

ELECTRICAL COMMUNICATION SYSTEM

Alfred Kienast, Spitzliweg 12, Erlenbach-Zurich, Switzerland

Filed July 14, 1958, Ser. No. 748,483
4 Claims. (Cl. 179—2)

This invention is an improvement on the device of my Patent No. 2,908,894, issued October 13, 1959, which describes a single line multi-frequency time division system for reading registers at remote localities. The most serious drawback for any system of remote reading is that it has to rely on long lines which are so expensive that an economic advantage is lacking. To minimize this difficulty, various systems have been proposed; however, the apparatus described for such cases are not simple and are not commercially feasible.

The present improvement describes how the part played by the single lines in the patent mentioned can be supplied by existing telephone loops subject to two essential conditions:

(1) The common telephone installations in the central office and in the substation require no change and only three additional relays are required in the substation and are disconnected if the subscriber at that substation is going to speak;

(2) The connection of the telephone loop for use as transfer line is effected by the normal telephone equipment in response to one pulse of a predetermined frequency originating at the central office.

It is therefore the principal object of the present invention to describe a transfer system which, in combination with the system of my Patent No. 2,908,894, reduces the price of the transfer operation by providing a commericially practical system for utilizing existing telephone loops over which the transfer is effected.

Another object is to provide an arrangement in which no change in the telephone installation is required and the normal telephone equipment in conjunction with a frequency pulse originating at the central station are employed to establish the wire connection between central station and substation.

These and various other objects and features of this invention will be more clearly understood from a reading of the detailed description in conjunction with the drawings, in which.

Figure 1:
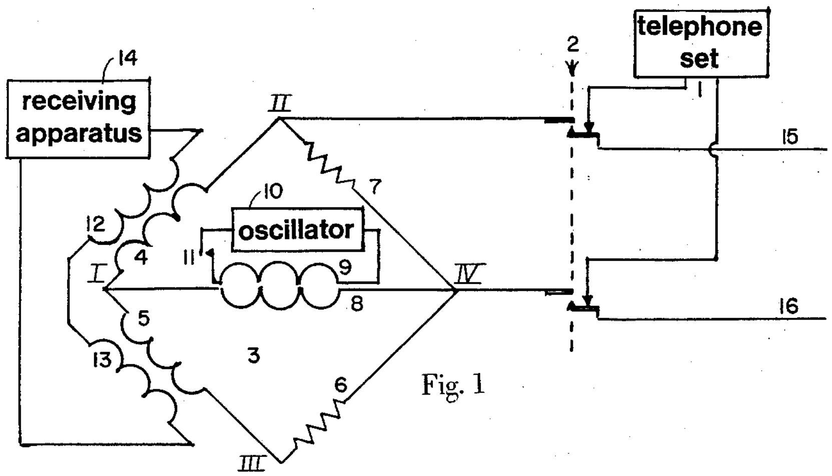
FIGURE 1 is a schematic representation of a portion of one illustrative embodiment of this invention, which portion is located at the central office or control station.

Referring now to FIGURE 1, there is depicted a portion of the equipment at the central office or control station. The numeral 1 designates the telephone set of the central station; the reference numeral 2 designates a continuity-transfer switch which maintains the connection to the telephone exchange through the wires 15, 16, while 3 designates a Wheatstone bridge of a form long known and used in telephony. See J. Schaltenbrand, "Telephonie," 2 vol., 3d ed., 1942; vol. 1, Fig. 8*a*; vol. 2, text p. 8, a publication of apparatus used by the Telephone Authority of Switzerland.

In the arms I—II and I—III, inductances 4, 5 are placed which are wound in the same sense and of the same resistance. The resistance 6 of a double, or noninductive, winding in arm III—IV serves as artificial line or for compensation purposes against resistance 7 in arm II—IV of the bridge in parallel with the telephone loop 15, 16. Furthermore, the resistances of the arms II—IV and III—IV are adjusted so that the bridge is approximately in equilibrium for the reception from 15, 16 of a frequency of 800 cycles per second. If this is the case, then there is no current in the diagonal between the corners I and IV. In this diagonal is placed an inductance 8 which is inductively coupled to another inductance 9 connected in series with an oscillator 10 of frequency $f4$ and a switch 11. A pair of inductances 12, 13 of equal resistance and wound in the same sense are serially connected and inductively coupled to the inductances 4 and 5, respectively. The serially connected inductances 12 and 13 are connected to the receiving apparatus 14.

The changes of current produced by oscillator 10 in the inductance 8 divide in corner I uniformly into both the arms I—II and I—III, i.e., both inductances 4 and 5 carry equal currents of opposite direction. They produce in the inductances 12 and 13 two currents which cancel and, accordingly, the apparatus 14 will not be influenced by the currents produced by the oscillator 10. In order to have a short designation, this bridge will be referred to as an anti-side-tone bridge.

However, if some current is introduced to this bridge arriving through the wires 15, 16 from the telephone exchange then equilibrium of the bridge is disturbed, the magnitude of the two currents produced in the arms I—II and I—III are unequal, and the variation of these intensities produces inductively in 12 and 13, and, therefore, in 14 a current which is used in the apparatus 14 for any convenient purpose. This explains the designation, "receiving apparatus."

Figure 2:
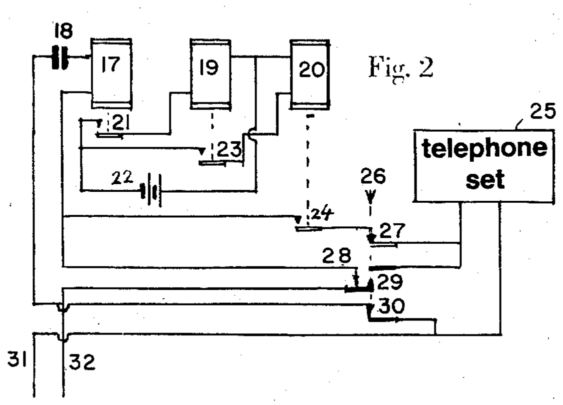
FIGURE 2 is a circuit diagram showing a portion of the equipment located at the substation, which apparatus serves to separate the first ringing pulse from the substations ringer and to connect only a number of the subsequent ringing signals to the ringer.
Figure 3:
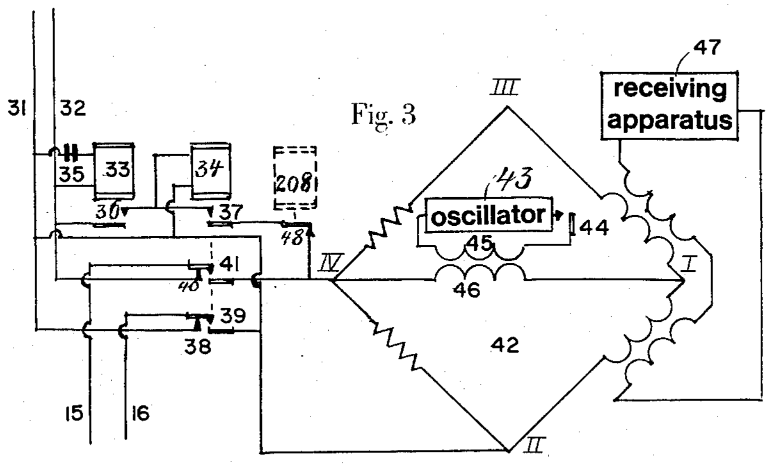
FIGURE 3 is a schematic circuit diagram of the equipment forming the substation of the transfer circuit.

Referring now to FIGURES 2 and 3, in each of them is depicted a portion of the equipment at the substation. At this substation two circuits exist; one, FIGURE 2, comprising the telephone set 25, and the second, FIGURE 3, being the part of the transfer circuit working at that substation. Both circuits are connected in parallel across the telephone loop and each resonant to its characteristic frequency.

The first of these circuits is designed to suppress the first ringing signal arriving and transmit only the second and further ringing signals to the telephone set 25 of the substation. It consists of the series-resonant circuit formed by relay 17 and capacitor 18, which circuit is resonant to the telephone ringing frequency. The relay 17 is energized and closes its contact 21, thereby connecting in circuit a local battery 22 and a slow-acting relay 19. Relay 19 has associated therewith a contact 23 which, when closed, connects in circuit a time-relay 20 and the local battery 22. Relay 20 has associated therewith a contact 24 which, when closed, completes the connection of the telephone set 25 to the telephone loop 31, 32. The operation is as follows: Relay 17 operates and closes its contact 21, thereby establishing current for relay 19. Relay 19 is adjusted in such manner that it closes its contact 23 at the end of the ringing signal so that relay 20 is energized and contact 24 closed at the end of the first ringing signal. The time-relay 20 is adjusted to keep its contact 24 closed for an interval of about twice the interval of a ringing signal. Therefore, contact 24 closes when the first ringing signal is ceasing and remains closed since relay 20 is energized by every ringing signal after the first. Accordingly, the second and following ringing signals arrive at the set 25 and all three relays 17, 19, 20 release after the ringing signals have ceased.

A multiple contact hook-switch 26, comprising a number of contacts 27, 28, 29 and 30 connects set 25 to the telephone loop 31, 32 when the handset, not shown, is lifted. At the end of the conversation, the subscriber replaces his set 25 on the hook and the switch 26 returns automatically to the unoperated condition, an arrangement well known in telephony.

The second circuit, FIGURE 3, is switched on by an impulse of frequency *f*4 from the central station energizing the circuit resonant to *f*4 comprising relay 33 and the serially connected condenser 35. When relay 33 closes contact 36, battery current flows from the telephone exchange to energize relay 34 which connects the Wheatstone bridge 42 to the telephone loop 15, 16 and disconnects the first of the two circuits. This is accomplished by the relay 34 in opening its contacts 38 and 40 and closing its contacts 39 and 41 which are continuity transfer contacts, i.e., make before break; at the same time relay 34 provides holding current for itself by closing its contact 37, contact 48 being closed.

Bridge 42 is similar to the Wheatstone bridge 3 previously described and is connected to the loop 15, 16 in a way similar to the way bridge 3 is connected. Thus, the combination of the loop 15, 16 and both of its terminal circuits 3 and 42 is in perfect electrical symmetry. The last named combination is moreover electrically of the same kind as the one which exists in a great number of telephone stations.

The operation is as follows: The operator at the central station, in dialing the substation, determines if this substation is busy; if it is not busy, then in disconnecting his telephone set 1 by using his continuity transfer switch 2, switches over to the transfer circuit. The first ringing signal actuates relay 17, which closes its contact 21. At the same time the ringing return current reaches bridge 3; it is a weak current; it is amplified at the receiving apparatus 14, if necessary, and immediately causes contact 11 to close and then causes the transmission of a signal frequency *f*4 from the oscillator 10 to the substation. This signal as described above, energizes relay 33, which closes its contact 36; thereby battery current from the telephone exchange energizes relay 34, which closes contact 37 and supplies itself with holding current after de-energization of relay 33. The closing of contact 36 has the same effect as when a called subscriber lifts his receiver, that is, the ringing current to the substation and the ringing return current to the central station cease. The ringing interval is long enough to allow for the energization of the relays named. Now relay 34 actuates the contacts 38, 39 and 40, 41 to complete the transfer circuit.

This transfer circuit now includes the two Wheatstone bridges 3 and 42, their associated apparatus and the connecting telephone loop 15, 16. It is disconnected from the telephone sets 1 and 25.

Figure 4:
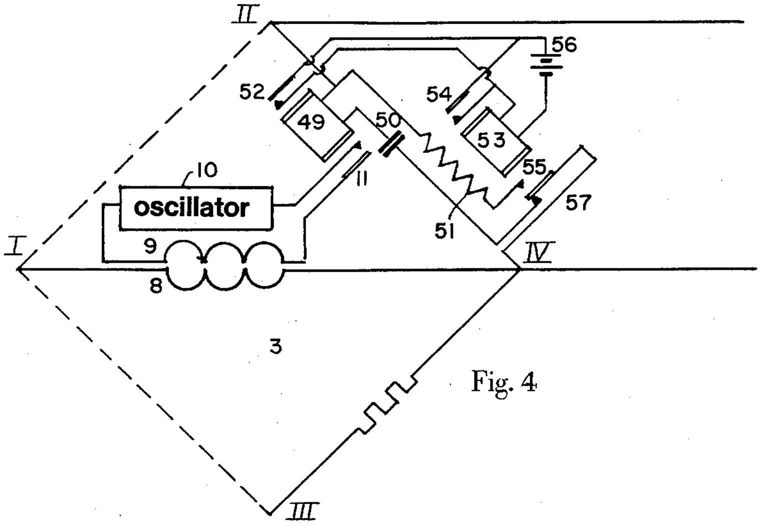
FIGURE 4 is a schematic representation of a modification of the circuit depicted in FIGURE 1.

A modification of the bridge 3 is shown in FIGURE 4. As therein depicted, the branch II—IV of the bridge 3 is modified to comprise two circuits and means so that they may be exchanged with one another. One of these circuits includes a series-resonant combination defined by a slow-release relay 49 and condenser 50 resonant to the frequency of the ringing current. The remaining parts of the Wheatstone bridge 3 are the same as shown in FIGURE 1; the contact 11 is now positioned to be operated by relay 49 which is energized by the ringing return current. During the first ringing signal the signal of frequency *f*4 is sent and relay 49 releases, somewhat delayed, and opens contact 11 thereby terminating the signal of frequency *f*4. But since the electrical characteristics of the series-resonant circuit of relay 49 and condenser 50 are determined by the frequency of the ringing return current, they are not the electrical properties best suited for this arm of the bridge. An arrangement therefore is added which replaces the series-resonant circuit of relay 49 and condenser 50 by a resistor 51 which may be determined in such a way that the modified bridge exhibits the balanced characteristics previously described. When relay 49 is energized, it closes its contact 52 in circuit with a local battery 56 and relay 53 which, when actuated, closes its contacts 54, 55 and opens contact 57. When the contact 57 is operated, it disconnects the circuit 49, 50. Contact 55 closes, completing the branch II—IV of the bridge through resistor 51. When contact 54 is closed, it provides holding current for relay 53 as long as resistor 51 in the branch is needed; this holding current may be interrupted by the operator by opening a contact (not shown) in the circuit of battery 56.

Advantageously, the oscillator 43 which produces the frequency *f*4 may be a transistor arrangement which is very small and may operate satisfactorily on a battery of nine volts. The frequency *f*4 may be of the order of 800 cycles per second, which is the same as that employed for oscillator 10.

The foregoing description of the operation is completed by showing how this circuit is to be connected to the circuit of Patent No. 2,908,894, referred to by the letter P.

In the central station of P there are three oscillators 100: *f*1 for delivering the starting signal (P, col. 3, *l.* 60); *f*2 for generating the stopping pulse (P, col. 3, *l.* 61); *f*3 for generating the reading signals (P, col. 4, *l.* 15). Since in P these signals are intended to pass through the central office and likewise through the substation, the circuits of these oscillators have in the present case to be connected in series with the inductance 9 at the diagonal of bridge 3. The oscillators in P, FIGURE 2, have to be omitted while the series circuit of which in P, FIGURE 2, in areas A, B, C; components 315, 316, 317 and 103 are parts, is to be identified with the one wire 15 here, and the return connection represented in P by ground is to be identified here with the second wire 16. Furthermore, in the arrangement in the substation here, FIGURE 3, signals from the central station arrive at the bridge 42 through the wires 15, 16 and are transmitted to the receiving apparatus 47; while in P the arrangement in the substation is shown in FIGURE 1. In FIGURE 1, there are circuits running from line 103 to ground. To serve for the two-wire system here the last named circuits are to be connected in circuit with inductance 45 and oscillator 43. Accordingly, the contact 44 represents any one of the contacts which in P, FIGURE 1, completes one of the channels at sometime during the reading cycle.

Finally, consider the operation of the parts in P, FIGURE 2, area C, which serve to register the result of the testing of the time channels, see P, col. 5, *l.* 50 et seq. In this area the signals *f*3 energize relay 434 which is connected between the wires 317 or 15 and ground, or wire 16. However, the connections of relay 430 must be adapted to the altered conditions. In P, FIGURE 2, area C, the signals *f*3 in the substation pass through a circuit closed to ground and thus energize relay 430; see P, col. 5, *l.* 60–65. In order to have a similar occurrence in the present case, an oscillator, i.e. 43, of frequency *f*5 is placed in series with inductance 45; then whenever this last circuit is closed, a current of frequency *f*5 in 45 induces a current of the same frequency in the inductance 46 which is transmitted to the central station and produces a current of frequency *f*5 in apparatus 14, which current energizes relay 430.

Now the same situation prevails as described in P, col. 5, *l.* 50 to col. 6, *l.* 5, and the same time-diagram is obtained as given in P, FIGURE 3.

When the sequence of time channels has run through its cycle, see P, col. 5, *l.* 27 et seq., a current frequency *f*2 flows through the arrangement energizing the relays 208 in the central station and in the substation, see P, FIGURE 1, and FIGURE 2; the contact 48 in the present FIGURE 3 is a contact of relay 208 which is added here; it opens when relay 208 is energized and at the same time as do contacts 209 and 210, relay 208. To remind that 48 is a contact of relay 208, relay in FIGURE 3 is shown in dotted lines. When contact 48 opens, it terminates the direct current from the telephone exchange whereby the telephone installation is restored to the unoperated condition.

While I have shown and described various embodiments of my invention, it is understood that the principles thereof may be extended to many and varied types of machines and apparatus. The invention, therefore, is not to be limited to the details illustrated and described herein.

What is claimed is:

1. A communication system comprising a telephone exchange central office and a plurality of subscribers apparatus, each including a transducer connected to the central office by individual pairs of subscriber lines, a control station including an operator's Wheatstone bridge located at the central office and having four arms connected to define two parallel paths and a diagonal arm connected intermediate each of said paths, transfer switch means for connecting said bridge to one of said pairs of subscriber lines said control station including a first signal means including means for generating a control frequency signal and means for inducing said control signal in the diagonal arm of said bridge and an operator's receiving apparatus inductively coupled to two of said four arms of said bridge, said subscribers apparatus further including Wheatstone bridge means and relay means for connecting said subscribers bridge means in parallel with the subscribers lines in response to said control frequency signal, said subscribers' Wheatstone bridge means including means for sending a signal to said central office when said subscribers bridge means is connected to said subscriber line.

2. A system according to claim 1, wherein said relay means includes a relay winding and a capacitor connected in a series resonant circuit in parallel with the subscriber lines.

3. A system according to claim 1, wherein each of said subscribers relay means includes a time relay and a slow acting relay each having a winding connected in said subscribers apparatus and operatively associated with said transducer, said slow acting relay controlling the connection between said transducer and the subscriber lines after a first signal is transmitted over said lines from said central office.

4. A system according to claim 2, wherein said subscribers apparatus includes a second series resonant circuit including a relay winding and a capacitor connected in parallel with the subscribers lines and wherein said subscribers apparatus includes time relay means for connecting said transducer to said subscribers lines after a first signal of the frequency at which said second resonant circuit is tuned is transmitted from said first signal means.

References Cited in the file of this patent

UNITED STATES PATENTS

| | | |
|---|---|---|
| 1,386,748 | Wilbur | Aug. 9, 1921 |
| 2,154,694 | Pakala | Apr. 18, 1939 |
| 2,401,024 | Sateren | May 28, 1946 |